United States Patent [19]

Idei

[11] Patent Number: 4,778,354
[45] Date of Patent: Oct. 18, 1988

[54] MOTOR TYPE FUEL PUMP

[75] Inventor: Michio Idei, Saitama, Japan

[73] Assignee: Jidosha Kiki Co., Ltd., Tokyo, Japan

[21] Appl. No.: 913,130

[22] Filed: Sep. 29, 1986

[30] Foreign Application Priority Data

Oct. 21, 1985 [JP] Japan .................. 60-159917[U]

[51] Int. Cl.⁴ .............................................. F04B 17/00
[52] U.S. Cl. .................................. 417/366; 417/423.14
[58] Field of Search .......... 417/423 T, 423 H, 423 R, 417/366, 357

[56] References Cited

U.S. PATENT DOCUMENTS

| | | | |
|---|---|---|---|
| 1,974,183 | 9/1934 | Gunderson | 417/357 |
| 2,321,126 | 6/1943 | Breuer | 417/423 R |
| 2,612,843 | 10/1952 | Gruetjen | 417/423 T |
| 3,764,236 | 10/1973 | Carter | 417/423 T |
| 4,177,021 | 12/1979 | Niedermeyer | 417/423 H |

FOREIGN PATENT DOCUMENTS 2620053 11/1977 Fed. Rep. of Germany ...... 417/423

OTHER PUBLICATIONS

Japanese Utility Model Laid-Open Specification No. sho 50-96202.
Japanese Utility Model Publication No. sho 52-35521.
Japanese Patent Laid-Open Specification No. sho 58-160545.

Primary Examiner—Carlton R. Croyle
Assistant Examiner—Timothy S. Thorpe
Attorney, Agent, or Firm—Blakely, Sokoloff, Taylor & Zafman

[57] ABSTRACT

A motor type fuel pump includes an armature housing made of a substantially cylindrical plastic member whose upper end is closed, and a pump chamber housing accommodating a impeller rotated by the armature and defining a pump chamber. The armature housing is adapted to accommodate motor components including an armature, a commutator, a cylindrical stator device consisting of a permanent magnet and a yoke. The armature housing has a plurality of ribs formed at predetermined angular intervals on an inner surface of the armature housing and extending along the longitudinal direction of the armature housing. The plurality of ribs are fitted on the yoke of the stator device. Fuel is supplied through a plurality of arcuated grooves which are defined by the outer surface of the yoke, the inner wall surface of the armature housing, and the ribs.

3 Claims, 3 Drawing Sheets

MOTOR TYPE FUEL PUMP

BACKGROUND OF THE INVENTION

The present invention relates to a motor type fuel pump and, more particularly, to a centrifugal motor type fuel pump arranged in an automobile fuel tank to supply fuel.

A conventional fuel pump of this type is arranged in a fuel tank and can prevent "vapor lock" caused by a high temperature of fuel more effectively than fuel pumps of other types. In addition, an installation space and a sealing structure need not be considered in this fuel pump. Conventional centrifugal motor type fuel pumps having different structures have been proposed. A typical conventional fuel pump of this type includes a substantially cylindrical armature housing with an upper closed end and a pump chamber housing. The armature housing accommodates an armature with a commutator, permanent magnets surrounding the armature, and a cylindrical stator with yokes. The pump chamber housing defines a pump chamber which receives a impeller. The impeller is fixed at the lower open end of the armature housing and driven by the armature. A pair of brushes are held in a brush holder in the armature housing and are biased to be in slidable contact with the outer surface of the commutator of the armature. External connection terminals electrically connected to the corresponding brushes run through holes formed in the armature housing or the like and are electrically connected to an external power source.

In this conventional centrifugal motor type fuel pump, fuel is drawn from a pump suction port formed in the pump chamber housing and is discharged from the pump chamber. The discharged fuel is guided to the upper end portion of the armature housing through spaces between the motor components such as the armature and the stator. Fuel is then fed to the engine through a discharge pipe.

In this fuel pump having the structure described above, however, fuel compressed in the pump chamber by suction through the suction port is guided to the upper end of the armature housing through small spaces between the motor components and is discharged through the discharge port. In this case, the small spaces cannot assure a sufficient fuel path area. In addition, fuel is directly stirred by a rotating member such as the armature to produce a flow resistance, and the fuel flow is disturbed by such rotation to form bubbles. This tends to pose problems such as vapor lock.

In order to solve these problems, in Japanese Patent Prepublication No. 58-160545 or Japanese Utility Model Publication No. 52-35521, a groove formed in a housing outside a stator is utilized as a fuel path running along the axial direction of the housing, or a groove formed in a holder integrally holding split permanent magnets is utilized as the fuel path. With these structures, a special groove must be formed to constitute a fuel path, which requires extra molding steps and increases the number of components. In addition, a sufficient path area cannot still be provided, and hence a proper discharge amount cannot be inevitably obtained.

Furthermore, a demand has also arisen for improving workability and assembly efficiency as well as compactness and light weight of the entire pump, in addition to the solution for the fuel path. Therefore, there is much room left to be improved.

SUMMARY OF THE INVENTION

It is a principal object of the present invention to provide a simple, inexpensive motor type fuel pump capable of preventing a fuel flow from being disturbed to reduce a flow resistance and hence assure a sufficient fuel discharge amount.

It is another object of the present invention to provide a motor type fuel pump which does not require high precision in component dimensions and can be easily assembled.

It is still another object of the present invention to provide a compact, lightweight motor type fuel pump.

It is still another object of the present invention to provide a motor type fuel pump with high mechanical strength.

In order to achieve the above objects of the present invention, there is provided a motor type fuel pump comprising: an armature housing made of a substantially cylindrical plastic member whose upper end is closed, the armature housing being adapted to accommodate motor components including an armature, a commutator, a cylindrical stator device consisting of a permanent magnet and a yoke; and a pump chamber housing accommodating a impeller rotated by the armature and defining a pump chamber; wherein the armature housing has a plurality of ribs formed at predetermined angular intervals on an inner surface of the armature housing and extending along a longitudinal direction of armature housing, the plurality of ribs being fitted on the yoke of the stator device, and fuel is supplied through a plurality of arcuated grooves which are defined by an outer surface of the yoke, the inner wall surface of the armature housing, and the ribs.

DESCRIPTION OF THE PREFERRED EMBODIMENT

The present invention will be described in detail with reference to the accompanying drawings.

Figure 1:
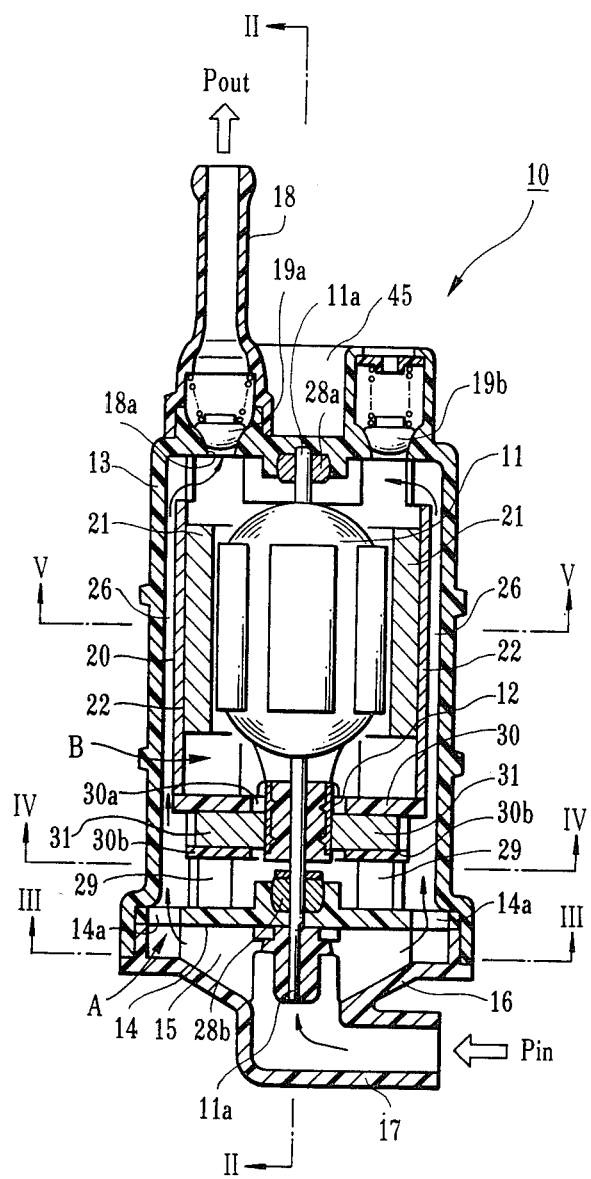
FIG. 1 is a longitudinal sectional view of a motor type fuel pump according to an embodiment of the present invention.
Figure 2:
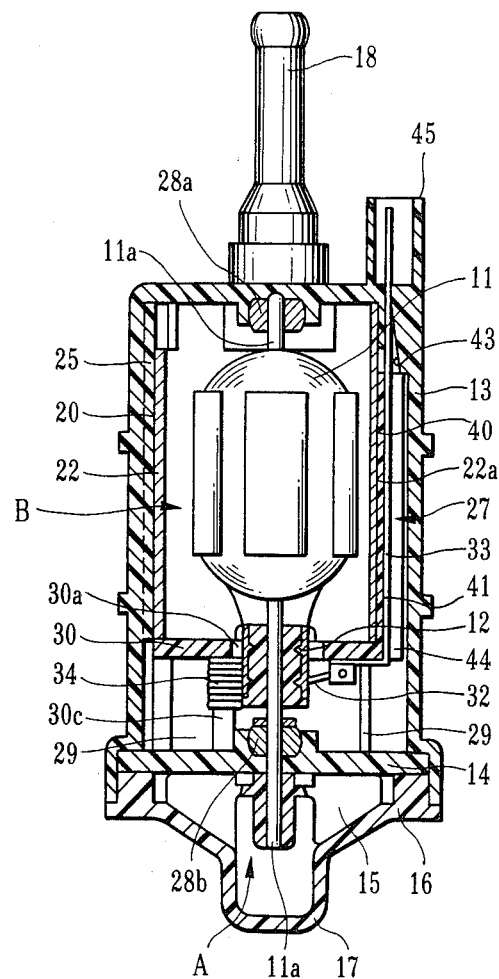
FIGS. 2 to 5 are cross-sectional views of the fuel pump in FIG. 1 when taken along the lines II—II, III—III, IV—IV, and V—V thereof, respectively.

FIGS. 1 and 2 show a motor type fuel pump according to an embodiment of the present invention. The overall structure of a motor type fuel pump 10 will be briefly described. The motor type fuel pump 10 comprises a plastic armature housing 13 and a plastic pump chamber housing 16. The armature housing 13 is made of a substantially cylindrical member with an upper closed end and accommodates motor components including an armature 11 and a commutator 12. The pump chamber housing 16 defines a pump chamber A for accommodating a impeller 15 (FIG. 3) fixed by plastic welding or the like to the open end of the armature housing 13 through a partition plate 14. A suction pipe 17 is integrally mounted on the open lower end of the pump chamber housing 16 to supply fuel to the central portion of the pump chamber A when the motor type fuel pump 10 is installed in an automobile fuel tank (not shown). A discharge pipe 18 is connected to fuel supply pipe (not shown) for supplying fuel fed through the armature housing 13 to an automobile engine and is fitted on the upper end of the armature housing 13. The discharge pipe 18 has a discharge port 18a at its lower end. A reverse flow preventive check valve 19a is fitted in the discharge port 18a. A relief valve 19b is fitted in the upper end of the armature housing 13 in the same manner as the check valve 19a to maintain a pump pressure below a predetermined value. The distal end of the cylindrical portion of the armature housing 13, which accommodates the relief valve 19b, is bent inward by heat caulking.

Figure 5:
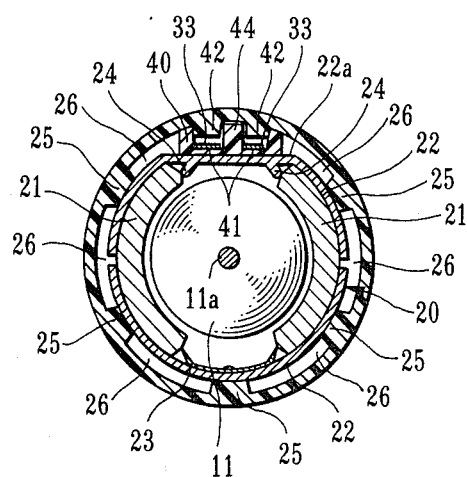

A cylindrical stator 20 is arranged in the armature housing 13 to surround the armature 11. As is best shown in FIG. 5, the stator 20 comprises a pair of arcuated permanent magnets 21 and a pair of arcuated yokes 22 fitted on the permanent magnets 21 so as to bridge them. The permanent magnets 21 and the yokes 22 constituting the stator 20 are respectively divided into halves since workability of split components can be improved and high precision thereof is not required. In addition, these split components can be simply assembled and easily mounted in the armature housing 13. The mounting operation can be achieved by insertion under pressure. Referring to FIG. 5, a leaf spring 23 is fixed to one of the yokes 22, and projections 24 are integrally formed on the other of the yokes 22 to elastically hold the permanent magnets 21 at predetermined positions with respect to the yokes 22.

According to this embodiment, as is apparent from FIG. 5, the stator 20 constituted by the permanent magnets 21 and the yokes 22 is held by a plurality of ribs 25 projecting on the corresponging positions at predetermined angular intervals of the inner wall surface of the armature housing 13. Each rib 25 extends along the axial direction of the housing 13. A plurality of arcuated spaces defined between the inner wall surface of the armature housing 13, the outer surfaces of the yokes 22, and the ribs 25 serve as fuel flow paths 26. This structure is the main characteristic feature of the present invention.

With this structure, by utilizing the plurality of ribs 25 formed on the inner wall surface of the plastic armature housing 13 and elastic deformation of the armature housing 13 itself, the stator 20 constituted by the permanent magnets 21 and the yokes 22 can be easily and properly inserted in the armature housing 13 under pressure. In this case, high dimensional precision of the components is not required. Moldability, workability, and assembly efficiency can be improved to reduce the fabrication cost. Although the structure is simple, the strength of the armature housing 13 is reinforced by the presence of ribs 25. In this sense, the thickness of the housing 13 can be reduced to a given extent. With this structure, the stator 20 can be simply inserted in the armature housing 13 by utilizing the elastic force of the housing 13. Therefore, a conventional fixing means such as caulking for fixing the stator at a predetermined position along the axial direction can be omitted.

In addition, the arcuated spaces between the inner wall surface of the housing 13, the outer surface of the yokes 22, and the ribs 25 are used as the fuel flow paths 26 which have sufficient cross-sectional areas to reduce a flow resistance. As a result, fuel can smoothly flow through the fuel flow paths 26, and fuel can be properly and accurately fed. These effects can be readily understood from the arrangement wherein small spaces in a motor chamber B having the armature 11 and the like provide a high flow resistance so that fuel does not positively flow through the motor chamber B but flows through the fuel flow paths 26 defined between the outer surfaces of the yokes 22 and the inner wall surface (including the surfaces of the ribs 25) of the armature housing 13. It should be noted that notches 100 are formed at the upper ends of the yokes 22 to guide fuel to the discharge port 18a.

Figure 3:
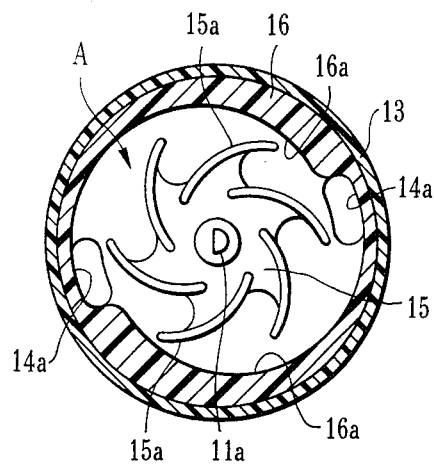

In this embodiment, one of the yokes 22 partially has a flat surface 22a, as shown in FIG. 5. A lead insertion path 27 (FIG. 2) is defined between the flat surface 22a and the inner wall surface of the armature housing 13 to guide elongated external connection terminals 33 connected to brushes 31 through pig tails 32 and to an external power source. Metal bearings 28a and 28b support both ends of an armature shaft 11a of the armature 11 and are respectively mounted in the upper end portion of the armature housing 13 and the partition plate 14 for partitioning a pump chamber A and the motor chamber B so as to rotatably support the armature 11 slightly spaced apart from the permanent magnets 21. As shown in FIG. 3, the impeller 15 has radial spiral fins 15a and is fixed to the distal end of the armature shaft 11a extending through the partition plate 14 located at the upper end of the pump chamber. Fuel is drawn from the suction pipe 17 upon rotation of the impeller 15 and is fed upward and discharged from discharge ports 14a and 14a located at peripheral portions of the partition plate 14. The inner wall portions defining the pump chamber A of the pump chamber housing 16 comprise a pair of arcuated surfaces 16a and 16a, the widths of which are increased toward the discharge ports 14a and 14a counterclockwise (FIG. 3), thereby balancing the inner pressure in the pump chamber A.

A brush holder 30 is disposed between the motor components such as the armature 11 and the partition plate 14 at the upper end of the pump chamber A. The brush holder 30 includes holder portions 30b for slidably supporting a pair of brushes 31 biased on the lower surface of a base plate to be in sliding contact with the commutator 12. The commutator 12 at the lower portion of the armature 11 is fitted in an opening 30a formed in the base plate so that the brushes 31 are located to face the opening 30a. Studs 29 extend on the peripheral portions of the partition plate 14 at predetermined angular intervals to position the base plate of the brush holder 30 at the pump chamber housing 16 along the axial direction. Springs 34 are wound around bosses 30c extending from the brush holder 30 to bias the brushes 31, as is apparent from FIG. 4.

The base plate of the brush holder 30 serves to close the open end of the space for accommodating motor components such as the armature 11 and defined by the yokes 22 and the like. Therefore, the base plate allows smoother fuel feeding along the fuel paths 26 formed between the inner wall surface of the armature housing 13 and the outer surfaces of the yokes 22.

Figure 4:
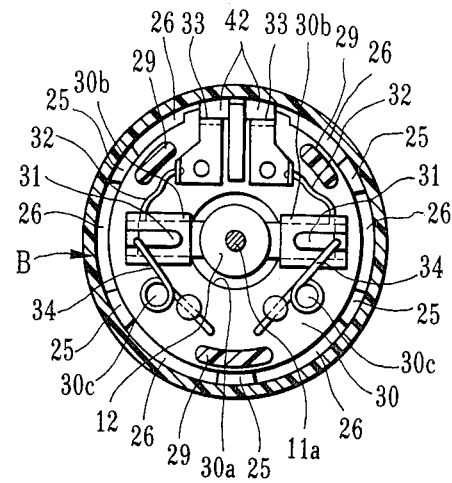

In this embodiment, as shown in FIGS. 2 and 5, a vertical member 40 is integrally formed with the plastic brush holder 30 disposed on the partition plate 14 for partitioning the pump chamber A and the motor chamber B accommodating the armature 11, the commutator 12, and the like. A pair of grooves 41 are formed on the outer surface of the vertical member 40 and receive the external connection terminals 33 respectively electrically connected to the brushes 31. As best shown in FIGS. 4 and 5, a pair of projections 42 extends on the inner wall surface of the armature housing 13 along the axial direction thereof and are fitted in the corresponding guide grooves 41 of the vertical member 40 so as to clamp the corresponding terminals 33. A pair of terminal guide holes 43 (FIG. 2) are formed continuously with the projections 42 so that the distal ends of the terminals 33 are guided to the upper end of the armature housing 13.

The external connection terminals 33 comprise substantially L-shaped wires, the lower ends of which are fixed to the lower end of the brush holder 30 and upper portions of which run in the guide grooves 41 of the vertical member 40. Reference numeral 44 in FIGS. 2 and 5 denotes a projection at the side of the brush holder 30 so as to isolate the terminals 33 from each other. The terminal guide holes 43 have upper end portions tapered toward the upper end of the armature housing 13, as shown in FIG. 2, so that the distal ends of the terminals 33 can be easily guided in an external electrode connection portion 45 outside the armature housing 13. A connector (not shown) connected to an external power source cable is attached to the external electrode connection portion 45.

With this arrangement, the external connection terminals 33 for connecting the brushes 31 to the external power source are accommodated in the grooves 41 in the surface of the vertical member 40 integrally formed with the plastic holder 30. The motor components are inserted in the armature housing 13 so that the terminals 33 are clamped between the grooves 41 and the corresponding projections 42 extending on the inner wall surface of the armature housing 13. Therefore, the terminals 33 are guided near the external electrode connection portion 45 arranged at the upper end of the armature housing 13, and the distal ends of the elongated terminals 33 can be easily and properly guided in the connection portion 45 through the guide holes 43 formed therein. The terminals 33 are not brought into direct contact with the armature 11 side, thereby providing complete electric insulation. At the same time, special members need not be used to fix the terminals, thus improving assembly efficiency and simplifying shapes and workability of the components.

The present invention is not limited to the arrangement described in the above embodiment. The shape and structure of the pump components may be arbitrarily modified and changed. The present invention is not limited to application to an automobile fuel pumps.

In the motor type fuel pump according to the embodiment described above, the plurality of ribs extend along the axial direction at predetermined angular intervals on the inner wall surface of the plastic armature housing, the armature housing being constituted by a substantially cylindrical member having an upper closed end so as to accommodate the motor components such as the armature, the commutator, the permanent magnets, and the yokes. The ribs support the yokes constituting the stator. The plurality of angular grooves defined between the outer surfaces of the yokes and the inner wall surface (including the surfaces of the ribs) of the armature housing are used as fuel paths. With a simple, inexpensive arrangement, the stator constituted by the permanent magnets and the yokes as motor components can be simply and properly inserted under pressure into the armature housing by utilizing the plurality of ribs formed on the inner wall surface of the plastic armature housing and elastic deformation of the ribs and the armature housing itself without requiring high molding precision. In addition, the mechanical strength of the armature housing can be reinforced by the presence of ribs so that the thickness of the wall surface of the armature housing can be reduced to increase the space between the inner wall surface of the housing and the outer surfaces of the yokes, thereby reducing the flow resistance, guaranteeing the sufficient path area, and allowing efficient flow of fuel.

What is claimed is:

1. A motor type fuel pump comprising:
    an armature housing made with a substantially cylindrical plastic member, the upper end of which is closed, said armature housing being adapted to accommodate motor components including a rotor having an armature and a commutator and a cylindrical stator device with a permanent magnet and a yoke,
    a pump chamber housing accommodating an impeller rotated by said armature and defining a pump chamber;
    wherein said armature housing has a plurality of riblike projections formed at predetermined angular intervals on the inner surface of said armature housing and extending along the longitudinal direction of said armature housing, said yoke comprising said stator device being directly held by said riblike projections and comprising a plurality of arcuated yoke members arranged to constitute a single circle, and fuel is supplied through a plurality of arcuated grooves which are defined by the outer surface of said yoke, the inner wall surface of the armature housing and said riblike projections;
    wherein one end of each of said yoke members is in contact with the upper end of said armature housing, and a plurality of concave notches are formed adjacent to said upper end of said armature housing so that fuel in said arcuated grooves is supplied to a discharge port formed at said upper end of said armature housing through said concave notches; and
    a brush holder mounted near the other end of each of said yoke members to hold said armature and said commutator which are accommodated in said armature housing, said brush holder being in slidable contact with said commutator;
    wherein said armature is supported by said upper end of said armature housing and by a partition plate mounted at a lower portion of said armature housing, fuel holes being formed in said partition plate.

2. A pump according to claim 1, wherein a brush holder member defining a motor chamber and holding a brush slidably in contact with said commutator is mounted on the other end of each of said yoke members.

3. A motor type fuel pump comprising:
    an armature housing made with a substantially cylindrical plastic member, the upper end of which is closed, said armature housing being adapted to accommodate motor components including a rotor having an armature and a commutator and a cylindrical stator device with a permanent magnet and a yoke,
    a pump chamber housing accommodating an impeller rotated by said armature and defining a pump chamber;
    wherein said armature housing has a plurality of riblike projections formed at predetermined angular intervals on the inner surface of said armature housing and extending along the longitudinal direction of said armature housing, said yoke comprising said stator device being directly held by said riblike projections and comprising a plurality of arcuated yoke members arranged to constitute a single circle, and fuel is supplied through a plurality of arcuated grooves which are defined by the outer surface of said yoke, the inner wall surface of the armature housing and said riblike projections;
wherein said armature is supported by said upper end of said armature housing and a partition plate mounted on a lower portion of said armature housing, and said partition plate constitutes a part of said pump chamber housing and is provided with fuel holes therethrough and a plurality of studs to position said brush holder in said pump chamber housing.

* * * * *